UNITED STATES PATENT OFFICE.

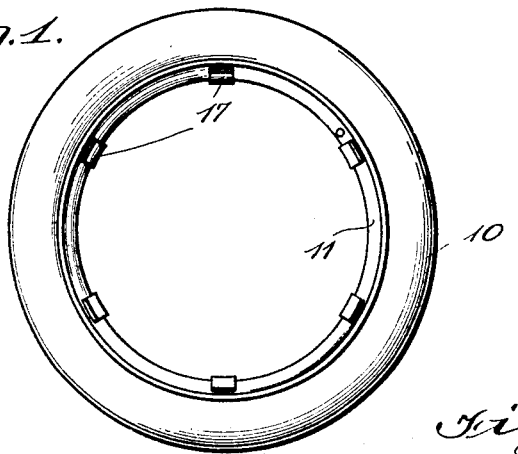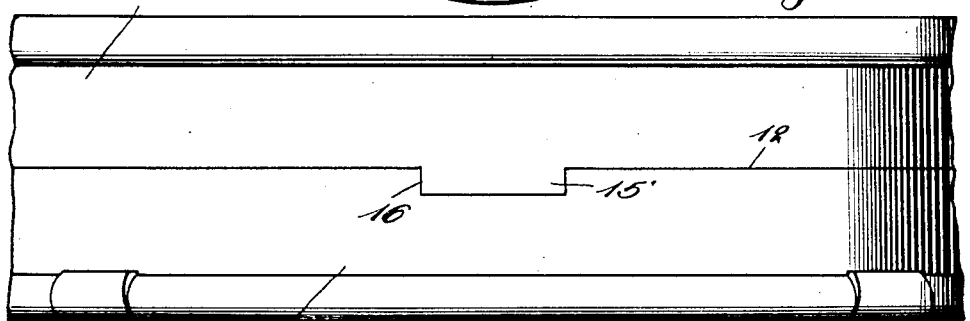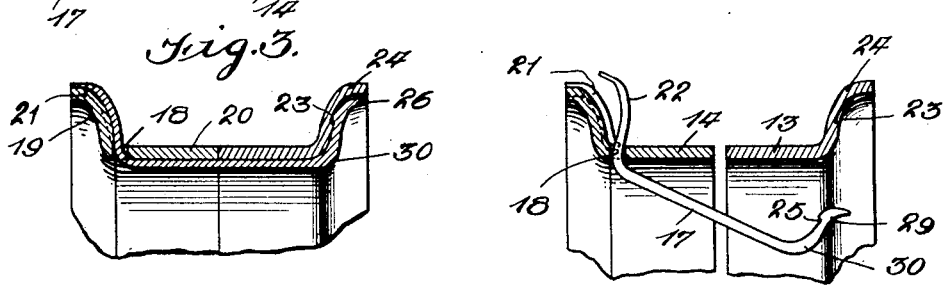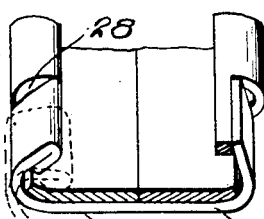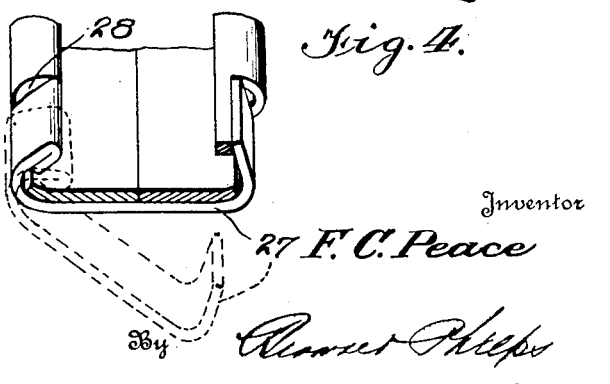

FREDERICK C. PEACE, OF HARRISBURG, PENNSYLVANIA.

DEMOUNTABLE RIM.

1,396,589.  Specification of Letters Patent.  Patented Nov. 8, 1921.

Application filed March 29, 1921. Serial No. 456,607.

*To all whom it may concern:*

Be it known that I, FREDERICK C. PEACE, a citizen of the United States, residing at Harrisburg, in the county of Dauphin and State of Pennsylvania, have invented certain new and useful Improvements in Demountable Rims, of which the following is a specification.

This invention relates to demountable rims for automobile tires, and has for its object the provision of a rim which will enable the user to change a tire with great facility.

A further object is the provision of a rim which will hold the tire securely and can not come apart when placed on a wheel.

Illustrative embodiments of the invention are shown in the accompanying drawings, in which—

Figure 1 is a side view of a rim with a tire in place;

Fig. 2 is a detail plan view upon an enlarged scale;

Figs. 3 and 4 are detail vertical sections showing a clamp in place and in the act of being removed respectively;

Fig. 5 is a detail perspective view of a modification.

In Fig. 1 a tire 10 is shown as mounted upon a rim 11 embodying the invention. In order that the rim may be separated to allow the removal of the tire, it is shown as divided at 12 into two similar rings 13 and 14. Preferably, projections 15 are formed upon the edge of one of the rings, as 13, and corresponding recesses 16 upon the edge of the other ring to prevent relative rotation of the rings when assembled, and to properly position the clamp engaging portions to be described.

In the form of the invention illustrated in Figs. 1 to 4 inclusive a series of clamps 17 are provided. An opening 18 is provided in one of the rings, as 14, adjacent the junction of the side flange 19 and the tread portion 20 thereof.

The depression 21 indicated in dotted lines in Fig. 3 may be formed by outwardly deflecting a portion of the material of the flange 19 and the end 22 of the clamp 17 which is shaped to substantially the contour of the cross section of the rim is passed through the opening 18 and lies in the depression 21.

When the clamp 17 is removed the end 22 must swing inwardly, as illustrated in Fig. 4, and this motion will be resisted by a tire when in place on the rim, even though deflated. This will prevent the loss of the clamps should they jar loose while the rim is being carried on the rear of a machine as a spare with the tire deflated.

A series of shoulders 23 are formed on the exterior surface of the flange 24 of ring 13, preferably by providing a depression or recess in the surface of the flange. The clamps 17 are each provided with a complementary shoulder 25 which is adapted to snap over the shoulder 23, as shown in Fig. 3, when the clamps are forced home. The clamps 17 are desirably formed of resilient material to provide for this action.

The end 29 of each clamp 17 is so shaped, as at 26, as to leave the surface of the flange 24 so as to permit the introduction of an end of a screw driver, which may be used as a lever to separate the shoulders 23 and 25. When the clamps have been brought to the position shown in Fig. 4 ring 13 may readily be separated from ring 14 and removed from the tire after which the tire may be removed from the tread portion 20 of ring 14. The reverse movements will be performed for the placing of a tire on the rim.

In Fig. 5 the invention is shown applied to a rim for a clencher tire. In this modification the end of the clamp 27 seats in a recess 28 in one ring of the rim and snaps over the exterior surface of the flange of the opposite ring. When the clamp 27 is removed to the position shown in Fig. 5 the end which seats in the recess 28 will swing inwardly after the manner already described in connection with the form of Fig. 4, contacting with the tire, and its movement will therefore be resisted by the tire to prevent its accidental loss.

When the assembled rim with the tire in place is placed upon a felly the clamps 17 or 27 will contact with the felly, taking the place of the usual spacing lugs, found upon the exterior of the felly, or upon the interior of the rims now in use and will therefore be positively held in engagement with the rim. The rings 13 and 14 therefore will be prohibited from separation. This hook end portion is preferably thickened, as shown at 30, for added strength.

Minor changes may be made in the physical embodiment of the invention without departing from its spirit.

I claim:

1. A demountable rim comprising, in combination, a rim divided in a plane passing through its tread portion, into two rings each having a side flange, one of said flanges being cut adjacent its base to provide a plurality of notches, a plurality of clamps each shaped to substantially the cross sectional contour of the rim, one end of each clamp in clamping engagement with one of said notches with its end portion substantially flush with the inner surface of the flange, the other end of each clamp adapted to hook about the other ring and engage the exterior of its flange whereby the rim is held in assembly.

2. A demountable rim comprising, in combination, a rim divided in a plane passing through its tread portion, into two rings, each having a side flange, one of said rings having a series of openings in its tread portion adjacent the flange, a series of clamps each adapted to subtend the tread portion of the assembled rim, one end of each clamp passing through one of said openings and lying in contact with the inner surface of the flange, the other end of each clamp hooking about the other ring with its end lying in contact with the exterior of its flange.

3. A demountable rim comprising, in combination, a rim divided in a plane passing through its tread portion, into two rings, each having a side flange, one of said rings having a series of openings in its tread portion adjacent the flange, and a series of depressions on the inner surface of its flange, a series of clamps, each adapted to subtend the tread portion of the assembled rim, one end of each clamp passing through one of said openings and lying in contact with the inner surface of the flange and within one of said depressions, the other end of each clamp hooking about the other ring with its end lying in contact with the exterior of its flange.

4. A demountable rim comprising, in combination, a rim divided in a plane passing through its tread portion, into two rings, each having a side flange, one of said rings having a series of openings in its tread portion adjacent the flange, the other ring having a series of shoulders on the exterior surface of its flange, a series of clamps each adapted to subtend the tread portion of the assembled rim, one end of each clamp passing through one of said openings and lying in contact with the inner surface of the flange, the other end of each clamp hooking about the other ring with its end lying in contact with the exterior of its flange and in engagement with one of said shoulders.

In testimony whereof I affix my signature.

FREDERICK C. PEACE.